Dec. 26, 1933.       V. V. VEENSCHOTEN       1,940,827
FEED WATER REGULATOR
Filed Dec. 3, 1931       5 Sheets-Sheet 1

INVENTOR:
Vincent V. Veenschoten
By E. J. Andrews
Atty.

Dec. 26, 1933.  V. V. VEENSCHOTEN  1,940,827
FEED WATER REGULATOR
Filed Dec. 3, 1931   5 Sheets-Sheet 5

INVENTOR
Vincent V. Veenschoten
BY
ATTORNEY

Patented Dec. 26, 1933

1,940,827

UNITED STATES PATENT OFFICE 1,940,827

FEED WATER REGULATOR

Vincent V. Veenschoten, Erie, Pa., assignor to Northern Equipment Company, Erie, Pa., a corporation of Pennsylvania Application December 3, 1931. Serial No. 578,658

27 Claims. (Cl. 122—451.2)

This invention relates to feed water regulators, the object of which is to supply water to boilers and the like, in accordance with the rate of flow of the steam from the boiler, and according to variations in the boiler water level changes; and to provide compensating means to maintain the water level substantially constant or within such limits as may be desired.

The invention comprises hydraulic means for controlling the flow of water to the boiler, and one of the objects has been to dispense not only with the ordinary thermostat or float means, but also to dispense with the use of levers or similar moving parts, so as to materially decrease the complications of the system. The liquid used in the operating means is preferably mercury, and by virtue of its density the use of relatively small quantities of liquid provides powerful means for operating the moving parts, such as the controlling valve. Also, the application of hydraulic means of this nature allows improved methods for controlling in any desired manner the flow of water to the boiler with reference to the flow of steam therefrom.

Figure 1:
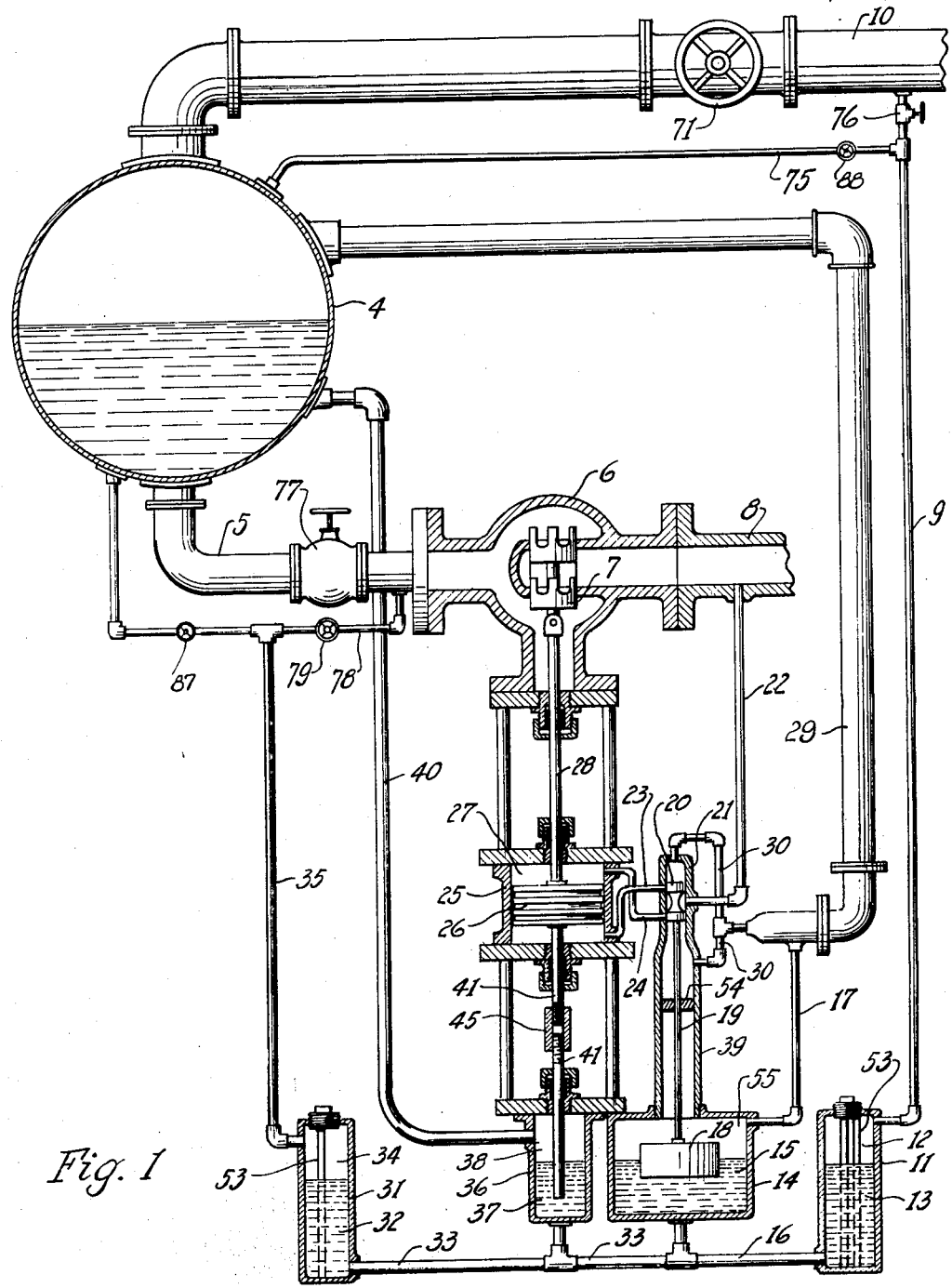
Figure 2:
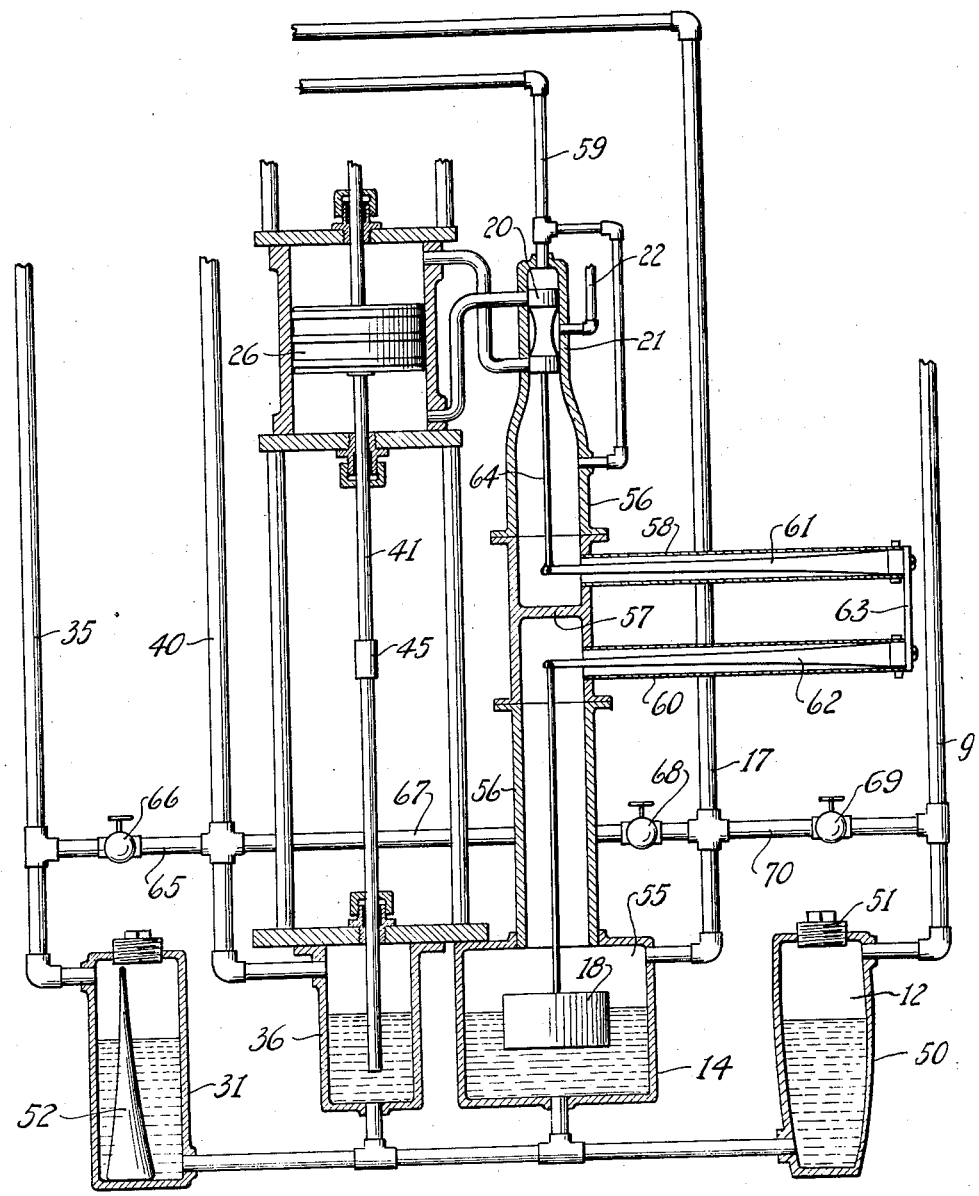
Figure 3:
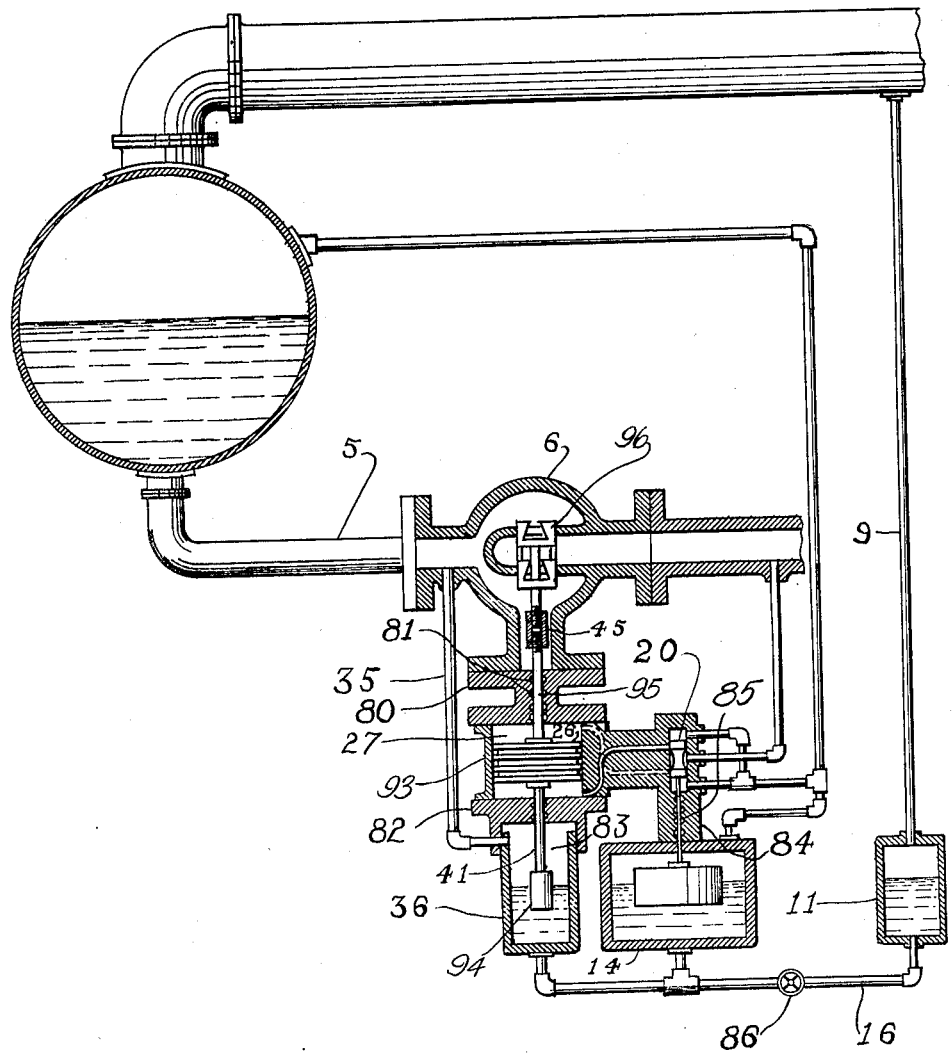
Figure 4:
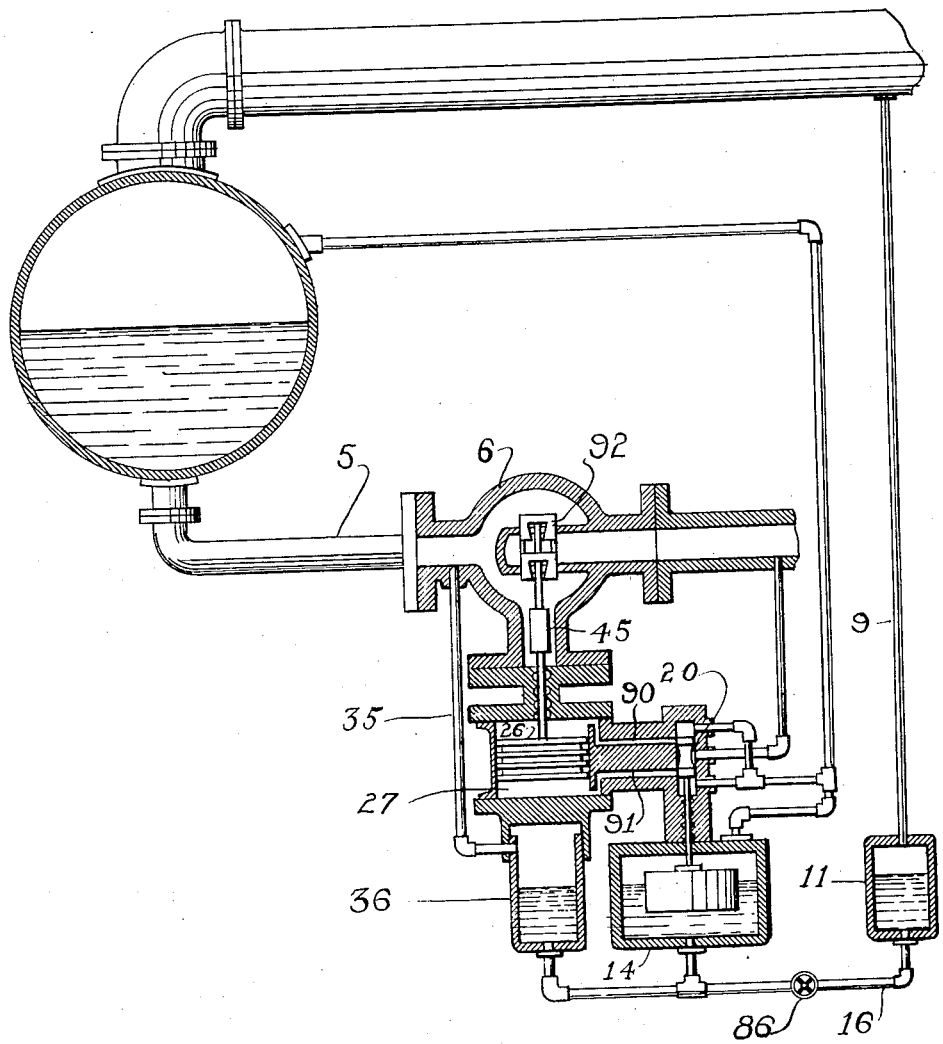
Figure 5:
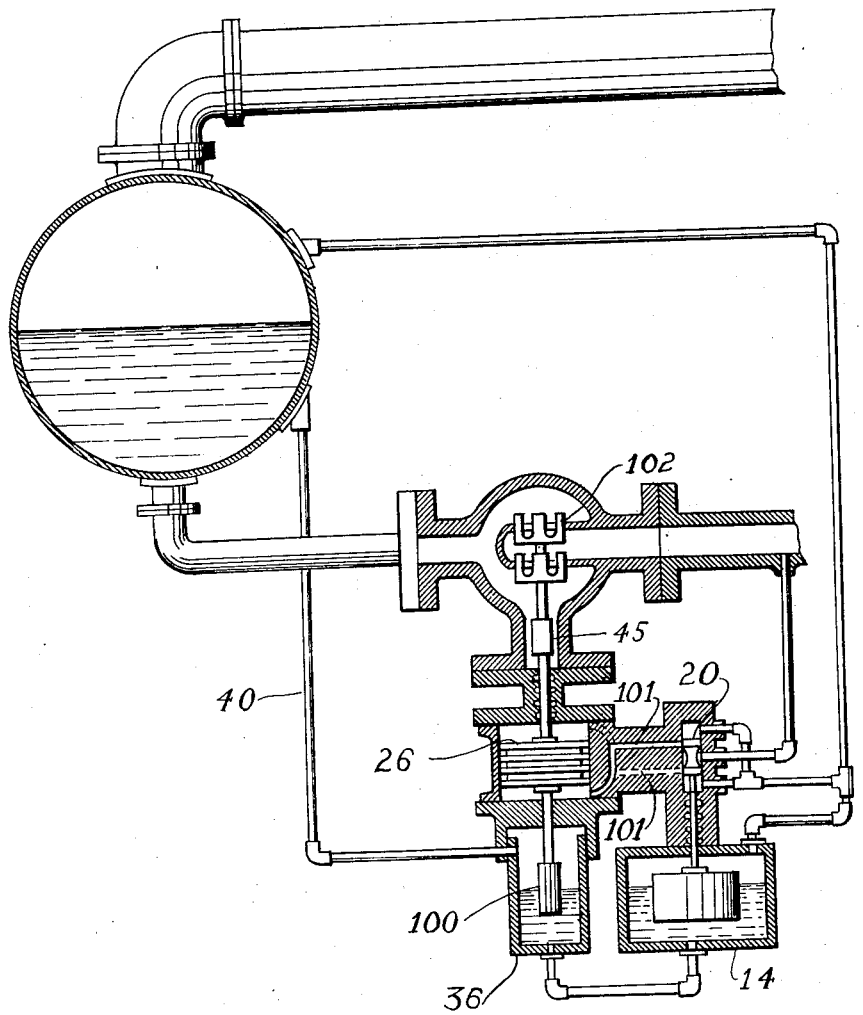

Of the accompanying drawings, Fig. 1 is a more or less diagrammatic sectional elevation of the boiler system and the means for regulating the flow of water thereto; Fig. 2 is an enlarged sectional elevation of the operating means showing certain features somewhat modified; and Figs. 3, 4 and 5 are sectional elevations of modified forms of the feed water regulator system.

In the operation of many modern boilers, it is desired to operate the boiler system at very high steam pressures and often at capacities beyond the normal rated capacity, and often with very material changes in load or in fire intensity. In such cases, the control of the water level elevation in the boiler must be according to various needs and, hence, under very sensitive control, and particularly so as to prevent abnormal high or low levels to avoid flooding or emptying the boiler inadvertently. By maintaining the water level within certain ranges most suitable for the system, the efficiency of the system is increased. Also, it is frequently desired to vary the water level materially with reference to the load on the boiler or the means for firing the boiler, either of which may be at times intermittent. For all of these purposes, the system which I have illustrated and described herein is particularly applicable.

With feed water regulator systems, it is now customary to have means responsive to the variations in the steam flow from the boiler for controlling the flow of water to the boiler; the aim being ordinarily to maintain substantially equal the mass of water and steam flowing into and from the boiler. It has been common in the past to provide such water flow control means by the use of thermostatic tubes, floats, electric means, or the like. In this case, I provide such means by the use of mercury columns and in the following described manner:

The boiler 4 is supplied with water through the pipe 5, the flow being controlled by the feed water valve 6 and the supply being received through the pipe 8 from any suitable source of supply under suitable pressure. The flow of water through the valve is controlled by the plunger 7, which is operated by the operating means so as to supply water to the boiler at a rate substantially equal to the rate of flow of steam from the boiler. The apparatus for supplying water at this rate is responsive to the rate of flow of steam from the boiler. This apparatus comprises a pipe 9 which is directly or indirectly connected to the steam main 10 of the boiler. This pipe is connected also to a container 11 having a chamber 12 in the lower portion of which is a suitable mass of mercury 13. In operation, the steam will pass from the steam main into the pipe 9 and condense therein so that the pipe 9 will always be full of water which presses downwardly on the upper surface of the mercury. The container 11 is connected, by a pipe 16, with a float casing 14 in the lower portion of which is a mass of mercury 15. The upper portion of the casing 14 is connected by pipes 17 and 29 with the steam space of the boiler. These pipes also, in operation, will always be full of water which condenses from the steam.

As a consequence of this arrangement, it will be seen that the mercury columns in the two vessels 11 and 14, together with the water pressures on the upper surfaces, will balance each other. Hence, if the pressure in either vessel varies, the relative mercury levels will also vary in elevation. When the steam flow from the boiler is uniform, the two mercury levels will assume a definite relation with reference to each other. If, however, the steam flow is increased by varying the opening of the throttle valve to the turbine or other apparatus, the pressure in the pipe 10 at the point of connection of the pipe 9 will decrease with reference to the pressure in the boiler, and the mercury level in the container 11 will be forced up somewhat by the greater pressure in the casing 14.

In the casing 14 is a float 18 which will rise or sink with the level of the mercury therein. This float is connected by means of a rod 19 with a pilot valve 20. This pilot valve is mounted in a casing 21 which is connected, by means of a pipe 22, to the feed water supply pipe 8. The casing 21 is also connected, by means of pipes 23 and 24, to a cylinder 25 in which is mounted a piston 26. The arrangement is such that, when the float 18 sinks, carrying with it the pilot valve 20, the water from the supply pipe will be free to flow through the pipe 22 and the pipe 24 to the upper end of the chamber 27, and the increased pressure thus produced above the piston will force the piston downwardly.

As the pilot valve 20 moves downwardly, allowing water to flow into the pipe 24, the outlet of the pipe 23 in the casing 21 is opened, and the water is free to flow from beneath the piston 26 through the pipe 23 and the pipe 30 to the pipe 29, thus forcing a corresponding amount of water from the pipe 29 back into the boiler. It will be understood that this follows because the pressure of the steam in the boiler must be materially less than the pressure of the water in the pipe 8.

The piston is connected by means of a stem 28 with the plunger 7. Hence, as the piston 26 is forced downwardly, carrying with it the plunger 7, the valve 6 will be opened more, allowing more water to flow to the boiler to meet the needs of the increased flow of steam.

However, when the pilot valve sinks, allowing increased pressure above the piston 26, it is obvious that the piston would be forced downwardly until the valve 6 is completely opened, unless means are provided for preventing this. One means which I provide for the purpose comprises a container 31 having a chamber 34 which also has mercury 32 in the lower portion and is connected by a pipe 33 to the chamber of the casing 14. The chamber 34 of the container 31 is also connected by a pipe 35 to the water supply pipe 5. When the valve 6 is opened more, increasing the flow of water therethrough, the water pressure in the pipe 5 at the point of connection of the pipe 35 will be increased, and this increase in pressure will force downwardly the mercury 32, thus forcing upwardly the mercury 15 in the casing 14. This, in turn, will force upwardly the pilot valve 20, thus closing the inlet to the pipe 24 and preventing further movement of the piston 26. If the various elements are properly arranged and designed relative to each other, the compensating effect of the mercury 32 will close the inlet to the pipe 24 at a suitable position of the plunger 7 to provide increased flow of water substantially equal to the increased flow of steam therefrom.

It will be understood that this entire process will be reversed when the throttle valve of the steam main is closed more so as to decrease the load on the boiler. In such a case, the pressure in the pipe 9 will be increased, the mercury 13 will be forced downwardly, the mercury 15 will be forced upwardly, and the pilot valve 20 will be forced upwardly, opening the inlet 23. The increased pressure beneath the piston will then force the piston upwardly and close more the valve 6. Also, when the piston is forced upwardly, the surplus water will be free to flow from the upper end of the chamber 27 through the pipe 24 and pipe 30 to the pipe 29. Also, the closing of the valve 6 will decrease somewhat the pressure in the pipe 5 and the pipe 35. This will allow the mercury 32 to rise somewhat. As a consequence, the mercury 15, the float 18, and the pilot valve 20 will sink, and this will close the inlet 23 to the piston chamber.

In the ordinary operation of a steam boiler of this nature, other means are used to prevent abnormal variations in the water level elevation in the boiler. Such means ordinarily are directly responsive to the variations in the water level. The means which I have described are also responsive to water level variations. While the elevation of the mercury 32 is affected by variations in pressure in the pipe 5, owing to variations in the opening of the valve 6, it is also affected by variations in the water level elevation in the boiler. Any increase in the elevation of the water level in the boiler will increase the pressure in the pipe 5 and, hence, in the pipe 35. As a consequence, in case of an increase in elevation of the water for any reason, the mercury 32 will be forced downwardly irrespective of any increase in opening of the valve 6. This will raise the mercury 15 and force upwardly the float and the pilot valve 20, closing more the valve 6. This water level effect is very quickly compensated for by the decrease in water level which decreases the pressure on the mercury 32 and allows the mercury 15 to sink sufficiently to close the inlet to the pipe 23 and thus to prevent undue closing of the valve 6. As a matter of fact, in operation the valve 20 would be raised sufficiently to merely allow a small amount of water to pass beneath the piston 26 and, as soon as the pressure in the pipe 5 decreased slightly, or the water level sank slightly, the pilot valve would close the inlet.

In connection with the regulating system, I prefer to provide an additional means for controlling the feed water valve according to the water level elevation, which is independent of the variations in pressure in the feed water pipe 5. This means comprises a container 36 with mercury 37 in the lower end of the chamber 38. The chamber 38 is connected to the water space of the boiler by a pipe 40. Hence, any variation in the water level elevation in the boiler will vary the level of the mercury 37, and, thus, of the mercury 15, just as with the container 31.

As another means of preventing over-running of the valve plunger, I provide a rod 41 connected to the piston 26 and projecting into the mercury 37. Any movement of the piston 26 will vary the depth the stem 41 passes into the mercury 37 and, hence, will vary the capacity of the lower end of the chamber 38 and the elevation of the mercury 37. Assuming that the valve 20 has been forced upwardly by the float 18 for any reason, such as by a decrease in flow of steam from the boiler, or an increase in elevation of the water in the boiler, the piston 26 will also be forced upwardly, carrying with it the stem 41 and allowing the mercury 37 to sink. This will allow the mercury 15 also to sink and, thus, to lower the pilot valve 20 and close the inlet 23 to the piston chamber. As a consequence, the stem 41, acting on the mercury 37, will act to prevent undue opening or closing of the valve 6.

Inasmuch as the lower ends of the controller chambers are all in communication with each other, the elevation of the mercury in each will depend upon the relative pressures of the water on the surfaces of the mercury, and any change in the water pressure in any chamber will affect more or less the elevation of the mercury in the others, and particularly in the float chamber. And, as the float is not affected by any stuffing boxes, the system is very sensitive with reference to any change in steam flow, water flow, or water level elevation, any such change instantly having an effect to suitably control the feed water valve according to the needs. If properly adjusted, with a float sufficiently large, any variation in the steam flow in the pipe 10 will vary accordingly the position of the plunger 7 so as to vary accordingly the flow of water to the boiler, maintaining the flow of water substantially equal to the flow of steam. And any variations in the flow of water to the boiler will tend to vary the position of the plunger 7 so as to maintain or bring about this equality of flow, or to maintain the water level within the desired limits.

In case of an increase in pressure in the pipe 8, owing to any external influence, such as the action of the pump thereon, there is a corresponding increase in the pipe 35, and this in turn elevates the mercury 15 and causes the plunger 7 to be elevated slightly to compensate for the increased water pressure and to maintain the flow of water constant.

It is desirable in connection with the system, to have certain adjusting means. For instance, any variation in length of the stem 41 will vary the elevation of the mercury 38 and, hence, of the mercury in the float chamber. This provides means for adjusting the position of the plunger 7 if desired, with reference to the water level elevation. If the stem is lengthened, the mercury 37 will be elevated, elevating also the float 18 and, thus, elevating the piston 26 and the plunger 7, thus decreasing the flow and allowing the average water level in the boiler to decrease. This decrease in the average water level will continue unless the stem is readjusted.

To provide for varying the length of the stem 41, I divide the stem into two sections which are connected by a coupling 45 into which the two sections of the stem are threaded. The pitches of the thread in the ends of the coupling are made unlike and, by rotating the coupling one way or the other, the length of the stem 41 will be varied. Or the coupling may be threaded onto one section only and may be fixed to the other section.

Also, the pressure in the steam main varies at a greater rate than the variation in flow of steam. Theoretically, the variations in pressure in the steam main are proportional to the square of the variations in steam flow. Hence, it is frequently desirable to reduce the effect of these variations on the elevation of the mercury 15. For this purpose, I prefer to make the chamber 12 of the container 50 (Fig. 2) more or less conical and at least smaller at the lower end than at the upper end. As a consequence, as the steam pressure increases, forcing the mercury downwardly, the flow of mercury from the chamber 12 to the float chamber 55 will be at a less rate than the increase in pressure on the upper surface of the mercury. If the chamber 50 is suitably formed, the effect on the float will be at all times directly proportional to the variations in the mass of steam flowing rather than to the variations in steam pressures acting on the pipe 9.

It is also sometimes desirable, under certain conditions, to vary temporarily, or for certain installations permanently, the capacity of the chamber 50, or the relative capacity of the lower end with reference to the upper or center portion; the greater the cross sectional area of this and the other auxiliary containers, the greater the effect on the float. For this purpose, I provide a plug 51, or similar means, for opening the casing, through which rods may be inserted in the chamber 50 to vary the cross sectional area of the container, or rods with varying cross sections may be inserted. Obviously, the cross section of these rods may be varied as desired to meet the needs, so as to control the effect of the variations in steam flow on the position of the feed water valve as may be desired.

Inasmuch as the variations in pressures in the pipe 5 also varies at a greater rate than the actual variations in flow of water, the controller 31 may be shaped accordingly, and rods 52 with varying cross sections may be inserted in this chamber also if desired. As the valve 7 opens more, the pressure in the pipe 35 increases at a greater rate than the increase in water flow, but the rod 52 allows proportionately less mercury to be forced into the float chamber than would be the case with a rod with parallel sides, or with the rod removed. Hence, the effect on the float is correspondingly less. However, rods with parallel sides may be inserted. This may be desirable so as to vary the relative capacities of the containers. For instance, as many rods 53 (Fig. 1) may be inserted as may be necessary for the purpose. In this manner, the relative effects of the pressures in these containers are varied.

Whenever the piston 26 is moved, as stated, there will be a flow through the pipe 29 back into the boiler, owing to the water being forced out of the piston chamber. This flow of water is generally slight, but in moving up in the pipe 29 the back pressure of this water is increased by the friction of the pipe. The effect of this friction is to increase the pressure in the float chamber through the pipe 17 or the pipe 39, and this tends to distort undesirably the movement of the float. Hence, I prefer to make the pipe 29 as large as is practicable, so as to reduce this friction to a minimum. Also, I insert a diaphragm 54 in the pipe 39, through which the rod 19 passes to eliminate the effects of the friction through the pipe 29.

To eliminate this slightly varying pressure in the float chamber, owing to the friction in the pipe 29, I provide modified means for transmitting the effect of the movement of the float to the pilot valve 20 (Fig. 2). To accomplish this, the connection between the float chamber 55 and the chamber of the pilot valve 20 is made so that there is no pressure communication between these chambers, except through the boiler drum. The pipe 56 takes the place of the pipe 39 which connected these chambers. This pipe is divided into two parts which are separated from each other by the diaphragm 57. Above this diaphragm a thin wall tube 58 connects with the upper portion of the pipe 56 and below the diaphragm a thin wall tube connects with the lower portion of the pipe 56. The outer ends of these tubes are closed. Arms 61 and 62 are mounted in the respective tubes and are rigidly secured to the outer ends of the tubes. The external outer ends of the tubes are connected by a link 63. Any movement of the float will thus communicate a similar movement to the arm 62, and this effect, by springing correspondingly the tubes 60 and 58, will give a similar movement to the arm 61 and, by means of the link 64, this movement will be transmitted to the pilot valve. In this manner, any change in pressure due to the flow of water passing through the pilot valve will not be conducted to the float chamber through the pipe 56. At the same time, the chambers 55 and of the pilot valve are connected to the steam space of the boiler entirely independent of each other, by means of the respective pipes 17 and 59.

It is desirable, in some cases, to have a by-pass manifold between the water spaces of each of the chambers of the regulator system, and this I illustrate in Fig. 2, in which the pipe 65 and valve 66 connect the pipes 35 and 40. Also, a pipe 67 with the valve 68 connects the pipes 40 and 17, and the pipe 70 with the valve 69 connects the pipe 17 with the pipe 9.

In this manner, with the valves open, the water from any of the pipes will be transmitted to the various chambers, and this will prevent any possibility of material displacement of the mercury in case the pressure in any line is less than normal. When in operation the valves are closed. As this manifold by-pass is not necessary to the main features of my invention, I have omitted it for simplicity in some of the figures.

It is common to insert a valve, such as the valve 71, in the steam main of the boiler adjacent the boiler; and, if the pipe 9 were connected to the steam main beyond this valve, as is shown in Fig. 1, and the valve 71 were closed, the pressure in the pipe 9 might be very materially modified, upsetting the proper balance of the mercury. For this purpose, I prefer to connect the pipe 9 in a shunt-line 75 and insert a valve 76 in this line, so that, if the valve 71 is closed, the regulator system will not be disturbed; and if it is desired to completely close the steam main, the valve 76 or 88 may also be closed without causing any disturbance.

Similarly with the feed water line. It is common to insert a valve 77 in this line and, for similar reasons, I prefer to provide a shunt-line around this valve by inserting the pipe 78 with the valves 79 and 87 therein. In this manner, the pipes 9 and 35 can readily be shifted closer to or farther away from the boiler, thus varying, as may better suit conditions, the drop in pressure in the shunt-line to the point of connection.

As explained hereinabove, both of the containers 31 and 36 are responsive to variations in elevation of the water level in the boiler. It is desirable in some cases to use both containers. For instance, the effect of the water level variations may be made greater by the use of the two containers. If it is desired to increase the effect of the variations in water pressure in the pipe 5 with reference to the water level variations, the capacity of the container 36 may be decreased relatively. This will increase the sensitivity of the effects of both the stem 41 and the varying pressures in the pipe 5.

However, either of these containers may be dispensed with, or the container 11 or 50 may be dispensed with if desired. If they are to be dispensed with temporarily, suitable valves may be installed in the various connecting pipes. As illustrated in Fig. 3, the container 31 is dispensed with and the container 36 is connected in communication with the supply pipe. In this case, it is connected directly to the outlet of the valve 6, by means of the pipe 35, this pipe, therefore, corresponding to pipe 35 of Fig. 1.

In this case also, the stuffing boxes of the system of Fig. 1, through which the stems 28 and 41 pass, are dispensed with. By connecting the container 36 directly on the end of the cylinder 93 and by connecting the upper end of this cylinder directly to the casing of the valve 6, neither the stem 41 of the displacement mass 94, nor the stem 95 of the valve plunger 96, passes outside of the casings. Inasmuch as the pressure in the chamber 27 is not materially greater than the pressure in the outlet of the valve 6, the tendency for the water to flow from the chamber 27 to the valve chamber is slight; and, by passing the stem 95 through a snugly fitting guide passageway in the casting 80, this leakage is immaterial and, in this manner, the friction of the stuffing boxes is eliminated. Annular grooves 81 also decrease the leakage. Similarly with the stem 41, with reference to the casing 82. The difference in water pressure between the chamber 83 and the lower end of the chamber 27 is not great, and any leakage there is not material. In this case also, I provide a similar passageway through the casting 84 for the stem 85 of the float; thus practically eliminating any effect on the float of the passage of water into or out of the casing of the pivot valve 20.

In this case, the displacement member 94 may be used as indicated to assist in compensating for the movement of the piston 26 caused by changes in flow of steam from the steam main.

However, this member may be omitted, if desired, and the system simplified somewhat, as indicated in Fig. 4. In this case, the omission of the displacement member allows also the omission of the stem 41, so that there is no communication between the container 36 and the chamber 27. Also, when the displacement member is omitted, the system may be simplified by eliminating the crossing of the passageways from the pilot valve chamber to the chamber 27. For instance, the passageways 90 and 91 are not crossed, as in the case of the other figures. To allow this, however, it is necessary to invert the plunger 92 so that it will close as it passes downwardly.

In this case, as the throttle valve of the system is closed more, the mercury in the container 11 will be forced downwardly, raising the float and the pilot valve. This will allow the water pressure to pass in the upper end of the chamber 27 and force the valve plunger 92 downwardly further, closing more the valve. Obviously, in such a case, the effect of the container 36 will be to compensate for the movement of the plunger as in the other cases. As the valve closes, the pressure in the outlet of the valve 6 will decrease, allowing the mercury in the container 36 to rise and, thus, allowing the float to sink and, thus, to close the passageway 90.

Also, if desired, the container 11 may be omitted. In this case, the system is responsive merely to variations in water level in the boiler. Fig. 5 illustrates one modification of this system. In this case, the container 36 is connected to the water space of the boiler, and the displacement member 100 is used therein. The arrangement of the passageways 101 is similar to the arrangement of Figs. 1 to 3, and the plunger 102 is similarly arranged.

If desired, the container 11 may be eliminated in case of the modification of Figs. 3 and 4, by merely closing the valve 86, it being understood that, in each case, the variations in elevation of the mercury in the container 36 are responsive to the variations of the water level in the boiler through pipes 5 and 35, so that any abnormal elevations thereof will be cared for as is the case with the container connected directly to the water space of the boiler.

In case of the modifications of Figs. 3 and 4, I prefer to form the ports of the plunger of the valve 6 as indicated. In this manner, the variation of the opening of the ports as the plunger moves may be made proportional to the variations in steam flow. As stated hereinabove, the pressure in the steam main varies at a greater rate than the variations in steam flow.

Hence, it is desirable to compensate for this, as was done in case of Fig. 2, by means of the rods 52 or the conically-shaped vessel 50. But, by providing valve ports, as indicated in Figs. 3 and 4, the increase in opening of the ports is at a less rate than the movement of the plunger and, hence, the change in flow of water may be made to substantially equal the change in flow of steam.

I claim as my invention:

1. In a boiler system having a steam main and a water supply pipe, a feed water regulator system comprising a valve mounted in said pipe and means for varying the opening of said valve; said means comprising a first and a second closed container, each container containing mercury, a pipe providing communication between the lower portions of said containers, means providing communication between the upper portion of said first container and the steam space of said boiler, means providing communication between the upper portion of said second container and said steam main, a float mounted in said first container floating on the mercury therein, said float by virtue of said communication means being responsive to variations in steam pressure in said boiler and in said steam main, and means operatively associating said float with said valve.

2. In a boiler system as claimed in claim 1, a third container containing mercury, the lower portion of said third container being in communication with said first container, and means providing communication between the upper portion of said third container and said supply pipe, said float, by virtue of said latter communication means, being responsive to variations in the liquid pressure in said supply pipe.

3. In a boiler system as claimed in claim 1, a third container containing mercury, the lower portion of said third container being in communication with said first container, means providing communication between the upper portion of said third container and said supply pipe, said float by virtue of said latter communication means being responsive to variations in the liquid pressure in said supply pipe, a fourth container containing mercury, the lower portion of said fourth container being in communication with said first container, and means providing communication between the upper portion of said fourth container and the water space of the boiler, said float by virtue of said latter communication means, being responsive to variations in water level elevation in the boiler.

4. In a boiler system having a steam main and a water supply pipe, a feed water regulator system comprising a valve mounted in said supply pipe, means for varying the opening of said valve, said means comprising a container, a liquid contained in said container, a float floating on said liquid, means responsive to variations in the steam pressure in said steam main for varying the elevation of said liquid in said container, means operatively associating said float with said valve, and means operatively associated with said valve for varying the elevation of said liquid as the opening of said valve is varied.

5. In a boiler system as claimed in claim 4, said liquid being mercury, said latter means comprising a second container, mercury in the lower portion of said second container, the lower portion of said containers being in communication with each other, said latter means comprising a member partly submerged in the mercury in said second container and being responsive to variations in the position of the plunger of said valve.

6. In a boiler system as claimed in claim 4, said liquid being mercury, said latter means comprising a second container, mercury in the lower portion of said second container, the lower portion of said containers being in communication with each other, said latter means comprising a member partly submerged in the mercury in said second container and being responsive to variations in the position of the plunger of said valve, and means providing communication between the upper portion of said second container and the water space of the boiler.

7. In a boiler system as claimed in claim 4, said liquid being mercury, said latter means comprising a second container, mercury in the lower portion of said second container, the lower portion of said containers being in communication with each other, said latter means comprising a member partly submerged in the mercury in said second container, and being responsive to variations in the position of the plunger of said valve, and said responsive means comprising a third container with its lower portion in communication with the lower end of the first mentioned container and its upper portion in communication with the steam main of the boiler, and mercury in the lower portion of said third container.

8. In a boiler system as claimed in claim 1, a casing in communication with the upper portion of said first container, a hydraulic cylinder comprised in the means associating said float with said valve, a pilot valve operatively connected with said float and mounted in said casing for allowing liquid under pressure to pass into said cylinder and from said cylinder to said casing, the said steam space being in communication with said casing on each side of said pilot valve.

9. In a boiler system as claimed in claim 1, a casing in communication with the upper portion of said first container, a hydraulic cylinder comprised in the means associating said float with said valve, a pilot valve operatively connected with said float and mounted in said casing for allowing liquid under pressure to pass into said cylinder and from said cylinder to said casing, a pipe connecting said casing on each side of said pilot valve with the boiler of the system, said casing being associated with said first container by a pipe, an imperforate diaphragm in said pipe between said pilot valve and the container, a thin-walled tube connected with said pipe on each side of said diaphragm, said tubes projecting outwardly in the same direction with their outer ends sealed and connected, and an arm within each of said tubes and rigidly fixed to the outer end thereof and projecting into said casing, one of said arms being operatively connected to said float and the other to said valve.

10. In a boiler system having a steam main and water supply pipe, a feed water level regulator system comprising a feed water valve, a first and a second container, pipes connecting the lower portions of said containers, a liquid in said pipe and said lower portions, a pipe connecting the upper portion of said first container with the steam space of the boiler, a pipe connecting the upper portion of said second container with the supply pipe, a float mounted in said first container resting on the liquid therein and thus responsive to the variations in the level elevation of the liquid therein, and means operatively associating said float with said valve.

11. In a boiler system as claimed in claim 1, the transverse sectional area of said second container varying with the distance from the bottom.

12. In a boiler system having a steam main and a water supply pipe, a feed water regulator system comprising a valve mounted in said pipe, and means for varying the opening of said valve, said means comprising three containers, the lower ends of which are in communication with each other, a liquid in the lower portion of each of said containers, one of said containers being connected by a pipe with the steam space of said boiler and a float contained in said container floating on the liquid therein, said float being operatively associated with said valve, a pipe connecting one of the other containers with the steam main of said boiler system, and a pipe connecting the third container with the supply pipe of said system.

13. In a boiler system as claimed in claim 12, a displacement member submerged in the liquid of said third container and being responsive to the movement of the plunger of said valve.

14. In a boiler system having a steam main and a water supply pipe, a feed water regulator system comprising a valve mounted in said supply pipe, and means for varying the opening of said valve, said means comprising two containers, the lower ends of which are in communication with each other, each container containing a liquid, one of said containers being connected by a pipe to the steam space of the boiler system, and a float in said last mentioned container floating on the liquid therein and being operatively associated with the plunger of said valve, the other container being connected by a pipe with the water space of said boiler and having therein a displacement member partly submerged in the liquid therein, said displacement member being responsive to the movement of said plunger.

15. In a boiler system as claimed in claim 1, the means providing communication between the second container and the steam main comprising a pipe connected to said steam main and to the steam space of the boiler, and a valve in the pipe.

16. In a boiler system as claimed in claim 1, the means providing communication between the second container and the steam main comprising a pipe connected to said steam main and the steam space of the boiler, a valve in said pipe, a third container containing mercury, the lower portion of said third container being in communication with the lower portion of said first container, and means providing communication between the upper portion of said third container and said supply pipe, said float, by virtue of said latter communication means, being responsive to variations in the liquid pressure in said supply pipe.

17. In a boiler system having a steam main and a water supply pipe, a feed water valve in the supply pipe, a feed water regulator system comprising four containers mounted substantially in the same level and with their lower ends in communication with each other, each container having mercury therein, two of said containers being connected with pipes to the water space of the boiler, and one of the latter containers being connected with the supply pipe, the other two containers being connected to the steam space of the boiler, and one of the latter containers being connected to the steam main, and the other having a float therein floating on the surface of the mercury, said float being operatively connected with said feed water valve, said container being connected to the steam main by a pipe connecting the steam main to the steam space of the boiler, and a valve in the connecting pipe.

18. In a boiler system as claimed in claim 1, the means providing communication between the second container and the steam main comprising a pipe connected to said steam main and to the steam space of the boiler, a valve in the main between the boiler and the point of connection of the pipe, and a valve in the pipe.

19. In a boiler system as claimed in claim 1, a metallic rod removably mounted in the second container.

20. In a boiler system having a steam main and a water supply pipe, a feed water regulator system comprising a valve mounted in said pipe, means for varying the opening of said valve, said means comprising a container containing mercury, and means rendering the mercury level elevation in said container responsive to the steam pressure in said boiler and in said main and to the water pressure in said supply pipe, said mercury level being operatively associated with said valve.

21. In a boiler system having a steam main and a water supply pipe, a feed water regulator system comprising a valve mounted in said pipe, means for varying the opening of said valve, said means comprising a container containing mercury, a float mounted in said container on the mercury therein, and means rendering the mercury level elevation in said container responsive to variations in the steam pressure in said boiler, the steam pressure in said main, the water pressure in the supply pipe, and the pressure of the water in the water space of the boiler, the float being operatively associated with said valve.

22. In a boiler system as claimed in claim 20, said mercury level being responsive to variations in the movement of the plunger of said valve.

23. In a boiler system as claimed in claim 21, said mercury level being responsive to the movement of the plunger of said valve.

24. In a boiler system as claimed in claim 1, the transverse sectional area of said second container varying with the distance from the bottom, and the liquid level in said first container being responsive to variations in the pressure of the water in said supply pipe.

25. In a boiler system as claimed in claim 1, the transverse sectional area of said second container varying with the distance from the bottom, the liquid level in said first container being responsive to the pressure of the water in said supply pipe, and said mercury level being responsive to the movement of the plunger of said valve.

26. In a boiler system having a steam main and a water supply pipe, a feed water regulator system comprising a valve mounted in said pipe, means for varying the opening of said valve, said means comprising a container containing mercury, and means rendering the mercury level elevation in said container responsive to the steam pressure in said boiler and to the water pressure in said supply pipe, and means operatively associating the said mercury level with the valve.

27. In a boiler system having a steam main and a water supply pipe, a feed water regulator system comprising a valve mounted in said pipe, means for varying the opening of said valve, said means comprising a container containing mercury, means rendering the mercury level elevation in said container responsive to the steam pressure in said boiler and to the water pressure in said supply pipe, said latter means comprising a pipe connecting the container with the steam space of the boiler, and means comprising a hydraulic motor operatively associating the said mercury level with the valve, the motor having a discharge pipe communicating with the last-mentioned pipe.

VINCENT V. VEENSCHOTEN.